United States Patent [19]

Chase, Sr.

[11] 4,053,173

[45] Oct. 11, 1977

[54] BICYCLE

[76] Inventor: Douglas Chase, Sr., Rte. No. 3, Box 422, Cheboygan, Mich. 49721

[21] Appl. No.: 669,606

[22] Filed: Mar. 23, 1976

[51] Int. Cl.² .............................................. B62M 1/04
[52] U.S. Cl. .................................. 280/253; 280/238; 280/257
[58] Field of Search ............... 280/220, 221, 236, 238, 280/253, 254, 255, 256, 257, 258, 262, 281 R

[56]  References Cited
U.S. PATENT DOCUMENTS

| 891,872 | 6/1908 | Smith | 280/238 |
|---|---|---|---|
| 1,503,878 | 8/1924 | Brady | 280/236 X |
| 1,606,332 | 11/1926 | Anderson et al. | 280/258 |
| 1,644,836 | 10/1927 | Jackson | 280/221 |

FOREIGN PATENT DOCUMENTS

| 357,805 | 8/1922 | Germany | 280/255 |
|---|---|---|---|

Primary Examiner—Philip Goodman
Assistant Examiner—Terrance L. Siemens
Attorney, Agent, or Firm—Gifford, Chandler, Sheridan & Sprinkle

[57] ABSTRACT

A bicycle of the type comprising a frame and a front and rear wheel rotatably mounted to the frame is provided with improved means for rotatably driving the rear wheel. The driving means comprises a right and left foot lever pivotally connected at one end to the frame and adapted to be alternately depressed by the feet of the bicyclist. Each foot lever is coupled by a link to a pivot rod pivotally connected to the frame so that the alternate depression of the foot levers rotates the pivot rod between a first and a second rotational position. A radial torque lever is secured to the pivot rod and coupled by a third link member to a radial torque lever on the rear wheel driving means. By means of the torque levers and the third link member, the pivotal action of the pivot rod from its first to its second rotational position effects a half revolution of the rear wheel driving means while the pivotal action of the pivot rod from its second to its first rotational position effects the second half revolution of the rear wheel driving means.

9 Claims, 6 Drawing Figures

BICYCLE

BACKGROUND OF THE INVENTION

I. Field of the Invention

The present invention relates generally to bicycles and, more particularly, to a lever actuated bicycle.

II. Description of the Prior Art

The driving means for most previously known bicycles having a frame and a front and rear wheel typically comprises a rotatably mounted front sprocket with foot pedals secured thereto. The front sprocket is connected by a chain to a rear sprocket on the rear wheel driving means so that rotation of the front sprocket rotatably drives the rear wheel. A major disadvantage of these previously known bicycles is that the bicyclist must pedal in a circular motion in order to propel the bicycle.

It has been found, however, that maximum propelling power is obtained by a vertically reciprocal action of the feet rather than the previously known circular motion of the feet. Consequently, it would be desirable to provide a bicycle having foot levers in which the reciprocal vertical action of the foot levers rotatably drives the rear wheel. Such a bicycle would also enjoy a greater mechanical advantage for propelling the bicycle than has been previously known.

As a result of the advantages enjoyed by a lever, rather than a pedal actuated bicycle, several previously known lever actuated bicycles have been heretofore devised. These previously known lever actuated bicycles, however, have not enjoyed wide commercial acceptance for a plurality of reasons.

One disadvantage of these previously known lever actuated bicycles is that such bicycles utilize overly complex linkage arrangements between the levers and the driving means for the bicycle rear axle. This complexity increases not only the overall cost but also the weight of the bicycle. Moreover, these previously known lever actuated bicycles were generally frail in construction and consequently prone to failure.

SUMMARY OF THE PRESENT INVENTION

The bicycle of the present invention overcomes the above mentioned disadvantages of the previously known bicycles by providing a lever operated bicycle which achieves a greater mechanical advantage and propelling power than the previously known sprocket and chain bicycles. Moreover, as will become hereinafter apparent, the lever operated bicycle of the present invention is not only of simple and rugged construction but is also inexpensive and light weight.

In brief, the bicycle of the present invention comprises a pair of elongated foot levers pivotally mounted at one end to the frame and adapted to alternately vertically reciprocate. Each of the foot levers is connected by a first link member to a pivot rod so that the depression of one of the foot levers rotates the pivot rod from a first to a second rotational position while the depression of the other foot lever moves the pivot rod from its second to its first rotational position.

A radial torque lever is secured to the pivot rod and is coupled by a driving link to a radial lever secured to the driving means for the rear wheel. By means of the pivot rod and the torque levers, the depression of one foot lever rotates the rear axle driving means one half of a revolution while the depression of the other foot lever completes the full revolution for the rear axle driving means.

BRIEF DESCRIPTION OF THE DRAWINGS

A better understanding of the present invention will be had upon reference to the following detailed description when read in conjunction with the accompanying drawing wherein like reference characters refer to like parts throughout the several views and in which.

DETAILED DESCRIPTION OF THE PRESENT INVENTION

Figure 1:
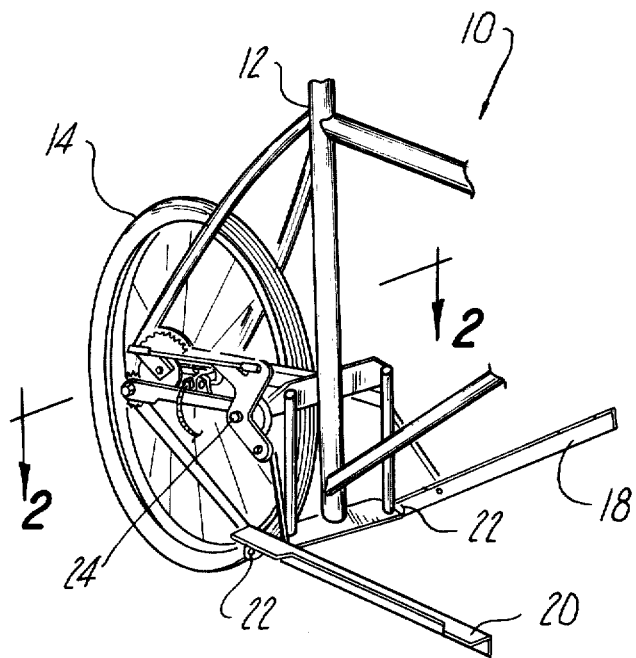
FIG. 1 is a fragmentary perspective view showing a portion of the bicycle of the present invention.
Figure 2:
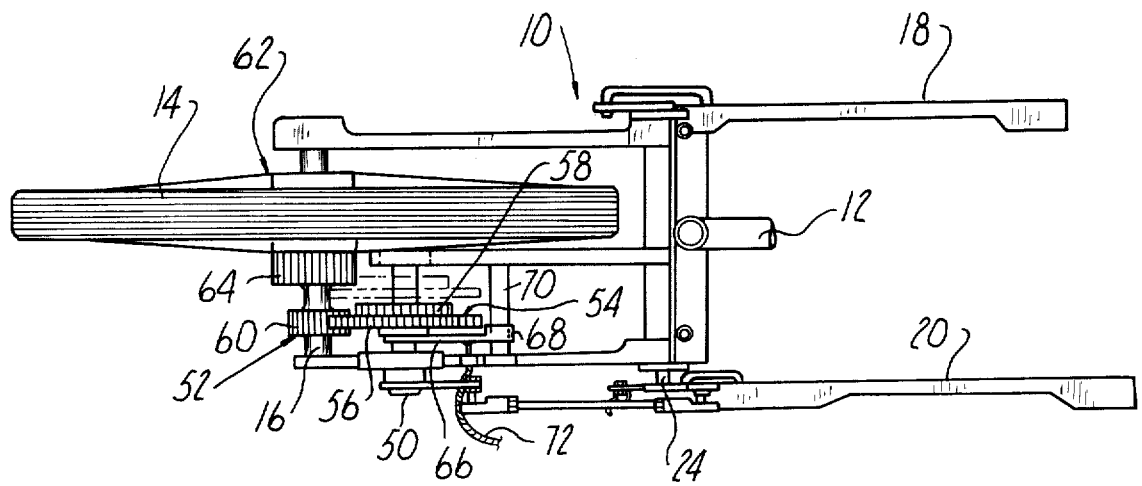
FIG. 2 is a fragmentary top plan view taken substantially along line 2—2 in FIG. 1.

With reference to FIGS. 1 and 2, a portion of the bicycle 10 of the present invention is there shown and includes a frame 12 and rear wheel 14 having a hub 62 rotatably mounted by an axle 16 to the frame 12. The bicycle 10 in addition includes a conventional front wheel, means for steering the front wheel and a braking mechanism. These elements, however, form no part of the present invention and therefore are omitted from the drawing for the sake of clarity.

Replacing the conventional foot pedals, a left and right foot lever 18 and 20, respectively, are pivotally secured by any conventional means, such as pins 22, at their rearward end to the bicycle frame 12. The pivotal axes of the foot levers 18 and 20 are preferably coaxial with each other and also parallel to the axis of the axle 16. Consequently, the foot levers 18 and 20 pivot in a generally vertical plane.

With reference to FIGS. 1-4, a pivot rod 24 is pivotally mounted to the frame 12 in a spaced and parallel relationship with the pivotal axis of the levers 18 and 20. The rod 24 rotates or pivots between a first and second rotational position which will be hereinafter described in greater detail. A first torque lever 26 is secured to the pivot rod 24 at one axial end thereof and substantially above the left foot lever 18 so that the torque lever 26 extends radially downward from the pivot rod 24. Similarly, a second torque lever 28 is secured to the other axial end of the pivot rod 24 so that the lever 28 extends radially outward from the pivot rod 24 and generally above the right foot lever 20.

Figure 4:
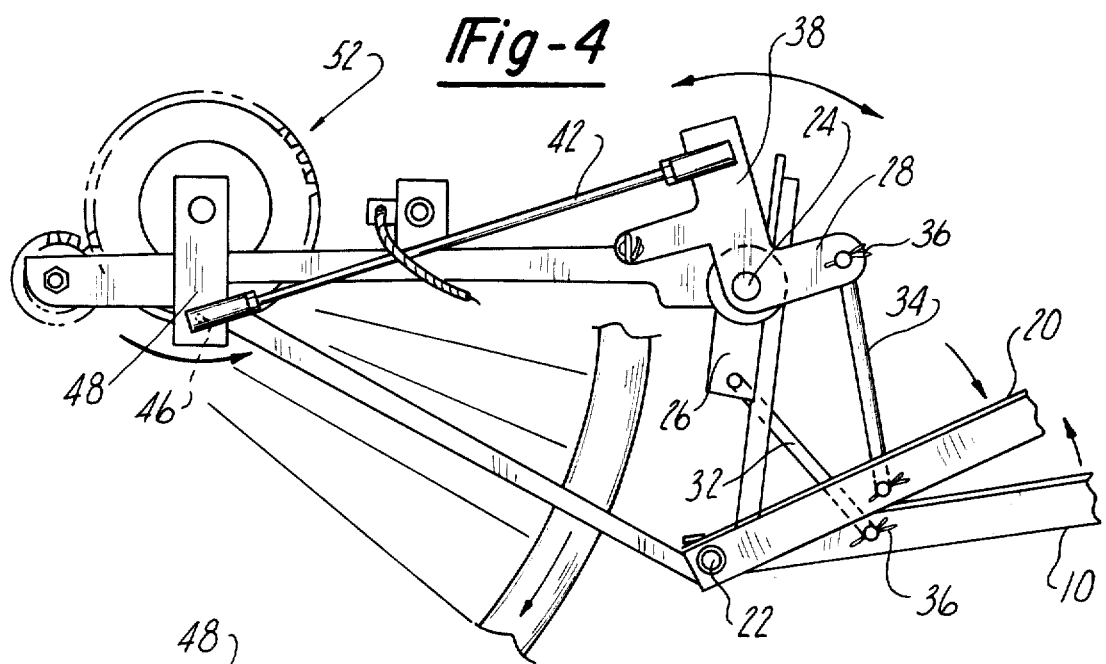
FIG. 4 is a fragmentary side plan view showing the driving means for the bicycle of the present invention.

As best shown in FIG. 4, a first link member 32 connects the outer end of the first torque lever 28 to the left foot lever 18 while similarly a second link 34 connects the outer end of the second torque lever 26 to the right foot lever 20. Although any appropriate means may be used to attach the links 32 and 34 between the torque levers 26 and 28 and the foot lever 18 and 20, respectively, preferably each end of each link 32 and 34 extends through an aperture in the appropriate torque lever or the foot lever and each end of the link 32 and 34 is retained in the aperture by cotter pin 36. This means of attaching the links 32 and 34 to the torque levers and foot levers, permits the links 32 and 34 to pivot relative to the torque and foot levers.

Still referring to FIG. 4, it can be seen that the depression of the right foot lever 20 causes the pivot rod 24 to rotate in a clockwise direction due to the coaction between the link 34 and the torque lever 28. Conversely, the depression of the left foot lever 18 causes the pivot rod 24 to rotate in a counterclockwise direction. This opposed pivotal action of the pivot rod 24 in response to the depression of the two foot levers 18 and 20 is due to the angularly spaced relationship of the torque levers 26 and 28. With this angular relationship, the first link 32 always lies on the left side (as viewed in FIG. 4) of a line bisecting the pivot rod 24 and the connection point of the first link 32 with the left foot lever 18. Conversely, the second link 34 always lies on the right side of a line bisecting the pivot rod 24 and the connection point of the second link 34 with the right foot lever 20.

Still referring to FIG. 4, a depression of the right foot lever 20 not only rotates the pivot rod 24 in a clockwise direction, but also vertically raises the left foot lever 18 due to the action of the first link member 32 and the torque lever 26 and vice versa. Consequently, the foot levers 18 and 20 alternately reciprocate in a vertical plane so that the foot levers 18 and 20 constantly move in opposite directions.

Figure 3:
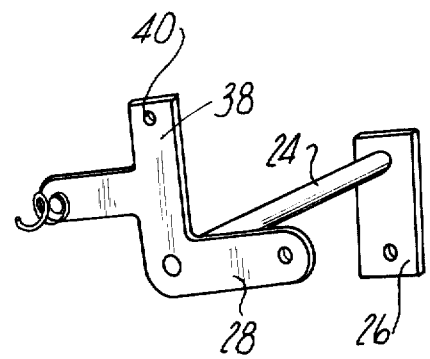
FIG. 3 is a perspective view showing the pivot rod and torque lever arrangement for the bicycle of the present invention.

Referring now to FIGS. 3 and 4, a driving radial torque lever 38 having an upper aperture 40 near its outermost end is secured to the pivot rod 24 and is preferably integral with the second torque lever 28. A third link 42 is coupled at one end to the aperture 40 of the driving torque lever 38 and at its other end to an aperture 46 formed near the outermost end of a driven radial torque lever 48. The driven torque lever 48 is secured at its other end to the axle 50 of a rear wheel driving means 52 so that rotation of the driven lever 48 effects a like rotation of the axle 50 of the rear wheel driving means 52.

With reference now particularly to FIG. 2, the rear wheel driving means 52 preferably includes a transmission 54 so that the bicycle 10 is capable of two speed operation as will become shortly apparent. A first gear 56 is coaxially fixed to a second gear 58 and the gears 56 and 58 are axially slidably mounted to the axle 50 so that the gears 56 and 58 are movable between a first position, shown in solid line and a second position shown in phantom line. The first gear 56 is of larger diameter than the second gear 58 and is adapted to mesh with a small gear 60 of the hub 62 of the rear wheel 14 when the gears 56 and 58 are in the first position. Conversely, with the gears 56 and 58 in the second position, the second gear 58 meshingly engages with a gear 64 on the rear wheel hub 62. The gear 64 is larger in diameter than the gear 60, and as a result, the gearing ratio between the axle 50 and the rear wheel hub 62 changes as the gears 56 and 58 move between their first and second position. The hub 62, of course, rotatably drives the rear wheel 14.

Still referring to FIG. 2, in order to move the gears 56 and 58 between their first and second position, preferably a pusher bar 66 is slidably coupled at one end 68 to a slide tube 70 and at its other end abuts against the first gear 56. Thus the pusher bar 66 carries the first and second gears 56 and 58 with it as it slides along the slide tube 70. Any conventional means, such as the Bowden cable 72, may be used to move the pusher bar 66.

Figure 5:
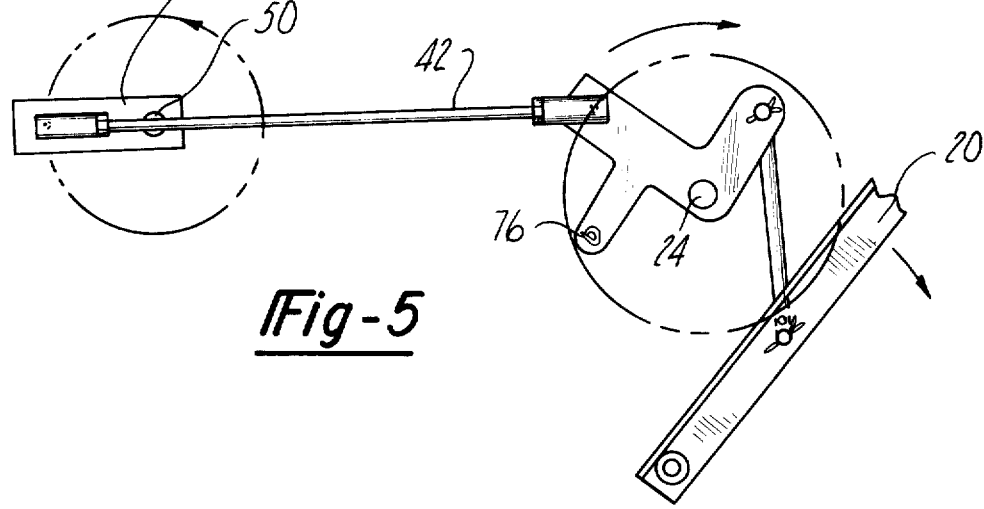
FIG. 5 is a side plan view similar to FIG. 4 but showing the driving means of the bicycle of the present invention in a different position and with parts removed for clarity.
Figure 6:
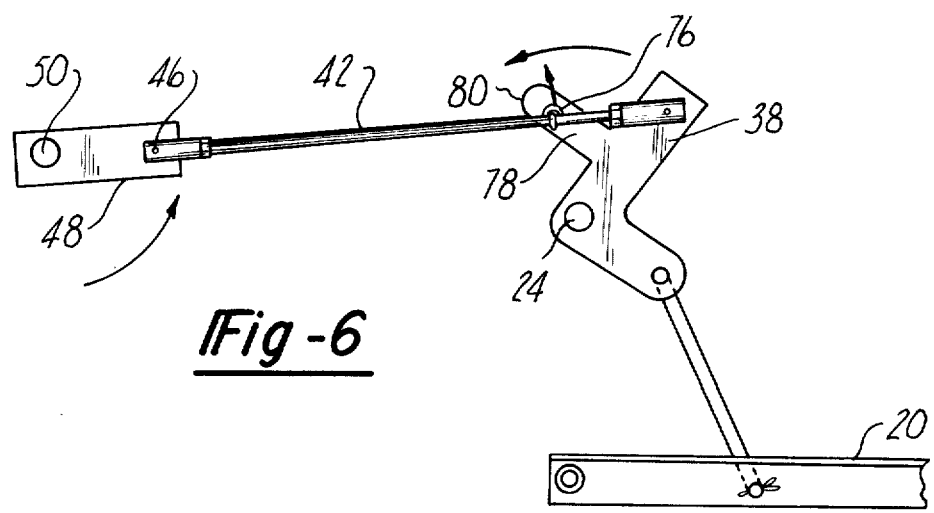
FIG. 6 is a fragmentary side plan view similar to FIG. 5 but showing the driving means of the bicycle of the present invention in yet a different position.

With reference now particularly to FIGS. 5 and 6, in FIG. 5 the pivot rod 24 is shown in its first, or most counterclockwise, rotational position. In this position the right foot lever 20 is in its most elevated position, while, conversely, the left foot lever 18 is in its lowermost position. In addition in the position shown in FIG. 5, the driving link 42 is extended rearwardly so that the rear torque bar 48 and axle 50 are rotated 180°.

A subsequent depression of the right foot lever 20 pivots the pivot rod 24 in a clockwise direction to its second rotational position which is shown in FIG. 6. In doing so the driving torque lever 38 moves the driving link 42 forward thereby rotating the rear torque lever 48 and axle 50 180° in the counterclockwise direction. Rotation of the axle 50 rotatably drives the rear wheel 14 as has been previously described. In addition the rotation of the pivot rod 24 from the first to its second rotational position raises the left foot lever 18 to its uppermost position.

A subsequent depression of the left foot lever 18 pivots the pivot rod 24 from its second to its first rotational position and simultaneously drives the rear torque lever 48 and axle 50 through an angle of 180° in a counterclockwise direction from the position shown in FIG. 6. In this fashion, the alternate depression of the foot levers 18 and 20 rotatably drives the rear torque lever 48 and axle 50 in a counterclockwise direction. This rotation in turn drivingly propels the rear wheel 14 by means of the transmission means 54 and rear wheel hub 62.

Still referring to FIG. 6, in order to insure the correct direction of rotation for the torque lever 48 and the axle 50, preferably a small spring 76 is coupled to the front torque lever 38 by an arm 78 which is preferably integral with the driving torque lever 38. The spring 76 contacts the driving link 42 when the pivot rod 24 is in its second rotational position and urges the driving link 42 upwardly as shown by arrow 80. The spring 76 insures that the depression of the left foot lever 18 rotatably drives the drive torque lever 48 in the counterclockwise direction.

It can thus be seen that the bicycle of the present invention provides a novel lever operated bicycle. However, unlike the previously known lever operated bicycles, the bicycle of the present invention is not only simple and relatively inexpensive in construction, but also durable and rugged in operation. Moreover, any desired mechanical advantage between the foot levers and the rear wheel 14 may be obtained by merely altering the connection point of the links 32 and 34 with the foot levers 18 and 20, or by changing the length of the foot levers or both.

Having thus described my invention many modifications thereto will become apparent to those skilled in the art to which it pertains without departing from the spirit of the invention as defined by the scope of the appended claims.

What is claimed is:

1. In a bicycle of the type having a frame, a front wheel and rear wheel rotatably secured to said frame, the improvement comprising:
a right and left elongated foot lever pivotally secured at one end to said frame,
a pivot rod pivotally connected to said frame and substantially parallel to the axis of rotation of said rear wheel,
means for rotating said pivot rod between a first and second rotational position in response to the alternate depression of said foot levers, and means for rotatably driving said rear wheel in response to the pivotal action of said pivot rod comprising an axle associated with the rear wheel and the rotation of which rotatably drives the rear wheel, a driven lever secured to and extending radially outward from said axle, a driving lever secured to and extending radially outward from said pivot rod, and a driving link having one end secured to said driving lever and its other end secured to said driven lever whereby rotation of the pivot rod from its first to its second rotational position effects a one half revolution of said axle while rotation of the pivot rod from its second to its first rotational position effects a one half revolution of said axle.

2. The invention as defined in claim 1, wherein said means for rotating said pivot rod comprises:
 a pair of torque levers secured to and extending radially outward from said pivot rod so that one of said torque levers is disposed generally above each of said foot levers,
 a first link coupled between one torque lever and one foot lever and a second link coupled between the other torque lever and the other foot lever so that the depression of one foot lever rotates said pivot rod from its first to its second rotational position while the depression of the other foot lever rotates said pivot rod from its second to its first rotational position.

3. The invention as defined in claim 1, wherein the rear wheel includes a hub rotatably mounted to the frame, and wherein said means for rotatably driving said rear wheel further comprises a transmission means between said axle and said hub.

4. The invention as defined in claim 3, wherein said transmission means further comprises:
 a large diameter gear coaxially fixed to a smaller diameter gear and both of said gears being axially slidably mounted on said axle,
 means for moving said gears between a first and second axial position,
 a first and second hub gear coaxially fixed to said hub wherein said large diameter gear meshingly engages said first hub gear in said first position while said smaller diameter gear meshingly engages said second hub gear in said second position.

5. The invention as defined in claim 4, wherein said first hub gear is smaller in diameter than said second hub gear.

6. The invention as defined in claim 4, wherein said means for moving said gears comprises an elongated pusher bar having one end slidably mounted to a slide tube and adapted to carry said large and smaller diameter gears at its other end.

7. The invention as defined in claim 1, wherein said driving lever and one of said torque levers are integral with each other.

8. The invention as defined in claim 1, wherein the axis of said pivot rod is substantially parallel to the pivotal axes of said foot levers.

9. The invention as defined in claim 1 and including resilient means for urging said driving link upwardly at the second rotational position of said pivot rod.

* * * * *